Oct. 6, 1964 L. D. LIPSCHUTZ 3,151,796
WEB FEEDING DEVICE
Filed June 29, 1961
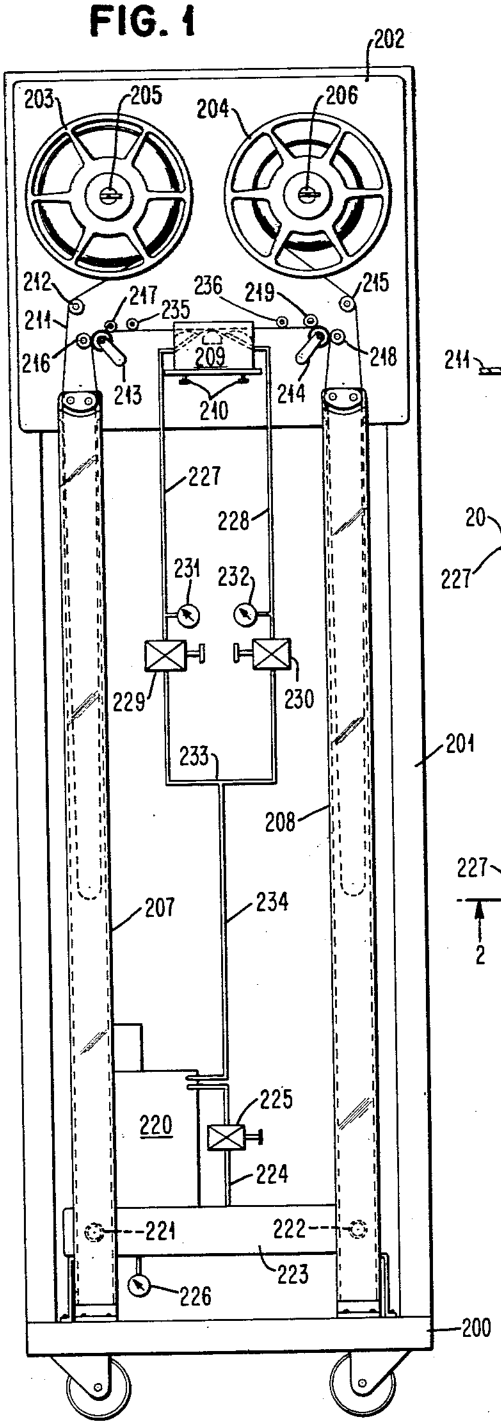
FIG. 2
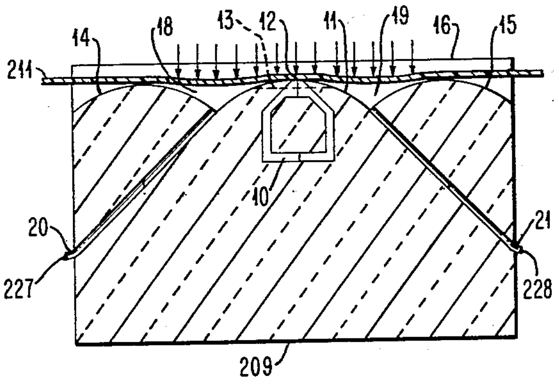
FIG. 3
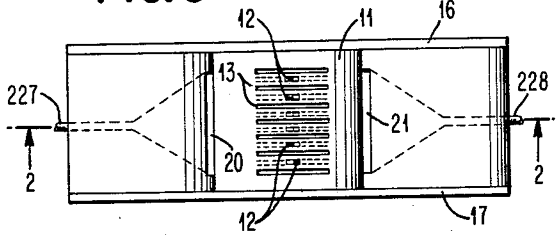
INVENTOR
L. D. LIPSCHUTZ
BY Geoffrey Knight
ATTORNEY

United States Patent Office 3,151,796

Patented Oct. 6, 1964

3,151,796

WEB FEEDING DEVICE

Lewis D. Lipschutz, Poughkeepsie, N.Y., assignor to International Business Machines Corporation, New York, N.Y., a corporation of New York Filed June 29, 1961, Ser. No. 120,561
10 Claims. (Cl. 226—97)

This invention relates to web feeding devices. More particularly the invention relates to means for maintaining closely controlled contact between a moving tape or web and an element coacting therewith. The invention was conceived as an improvement in magnetic tape systems and the description thereof, therefore, will be developed with reference to such systems. It is understood, however, that the invention herein described can easily be adapted to any web feeding apparatus.

In the more common tape recording devices, the tape is held in direct contact with the head. Means, such as pressure pads, are employed to achieve more intimate contact and to eliminate an uncontrolled air film which tends to occur between tape and head. In these devices, however, a comparatively large surface contact area (wrap angle) and tape tension are necessary to maintain the tape in close contact with the head and, thus, attain a large signal amplitude. This large contact surface together with the normal force necessary to maintain contact cause great frictional wear of the head surface, and cause oxide to be scraped off the tape. This loose oxide tends to collect or "build up" on the head surface causing the tape to separate from the head. The use of a pressure pad aggravates this wear condition by increasing the normal force and, thus, the frictional force between tape and head.

As the tape recording art has progressed to faster tape speeds, in order to accommodate higher information densities, the head wear problem and oxide build-up problem have become more acute. The above problems have been met by maintaining a thin, controlled air film between tape and head, as opposed to eliminating the air film. This approach reduces head and tape wear, but has the disadvantages of decreased signal intensity because of head to tape separation and variations in signal intensity caused by the difficulty of maintaining a uniform separation across and along the tape, particularly during acceleration and deceleration of the tape.

It is therefore a paramount objective of this invention to provide an improved tape feeding device which will maintain uniform head-to-tape contact, with a small contact area, and a minimum of head-to-tape normal force.

There have also been various attempts in the past to clean the tape surface. Various means have been used, such as a knife edge which scrapes loose oxide and dirt particles from the tape; a fabric covered wheel which rubs against the tape surface; or vacuum cleaners which clean the tape before it passes over the head. The cleaning of the head surface itself has been limited to manual maintenance because the tape is in contact with the surface during reading and writing operations. In none of these systems is the tape cleaned while it is passing over the transducer.

Therefore, a further object of this invention is to provide an improved head surface and tape cleaning apparatus, which will clean both head and tape during the operation of the tape feeding device.

Briefly, the invention is concerned with a device by which a magnetic tape is held in direct contact with a transducer surface in such a way that there is a minimum amount of direct contact with other portions of the head. In such a device, there is a combination which comprises a tape leading portion supporting means, a tape trailing portion supporting means, for supporting a span of tape therebetween, and a transducer located intermediate the two supporting means positioned so as to contact the tape. A vacuum producing means may be provided for evacuating the air volume between the transducer and either or both supporting means in order that the tape will be held in contact with the transducer surface by downward normal forces created by atmospheric pressure acting upon the span of tape. The leading and trailing portions supporting means may be dynamically air lubricated and downward normal forces may be created by the tension and angle of wrap about the supports. This arrangement limits the tape contact area to only a small portion of the transducer surface. Since the supports are air lubricated and take the brunt of downward force, friction is kept low. Thus, the invention has the advantage of low transducer-to-tape friction peculiar to air film lubricated transducers but overcomes the disadvantages of such transducers, by affording direct contact at the transducer surface where tape-to-head separation would cause signal loss.

A further advantage of the invention is the cleaning property of the vacuum source. Any loose oxide or dirt particles on the tape are drawn away before the tape passes over the transducer. Also, because of the intimate location of the vacuum source, the transducer surface itself is constantly being subjected to the cleaning action of the vacuum.

The foregoing and other objects, features and advantages of the invention will be apparent from the following and more particular description of the preferred embodiment of the invention, as illustrated in the accompanying drawings.

In the drawings:

FIG. 1 is a front elevation of a magnetic tape feeding machine in which the invention is embodied;

FIG. 2 is a vertical sectional view of the read-write head shown in FIG. 1; and

FIG. 3 is a plan view of the read-white head shown in FIG. 2.

The tape transport of FIG. 1 is of the kind generally employed in connection with the input and output of data for computers and data processing systems. For the purpose of illustration, the invention herein is disclosed as embodied in a tape feed mechanism of the type shown in J. A. Weidenhammer et al., Patent 2,792,917, issued May 14, 1957. The machine comprises a base 200, upright supporting structure 201 and a reel panel 202, together forming a supporting structure in which the operative mechanism of the tape processing equipment is mounted. At the face of the reel panel 202 are a pair of magnetic tape reels 203 and 204 mounted for rotation with reel spindles 205 and 206, respectively. Both reels are adapted to be driven in either direction by means of motors operatively connected to the reel spindle drive mechanisms (not shown) mounted at the rear of the reel panel 202.

Extending from the base 200 to the reel panel 202 and located under the respective reels 203 and 204 are a pair of vacuum columns 207 and 208. Each of the columns comprises an enclosure for a tape loop depending from the appurtenant reel, so that a loop of tape depending into either column divides the column into an upper portion open to the atmosphere and a lower portion below the bight of the loop, which is substantially sealed from the atmosphere by the tape, as taught in said Weidenhammer et al. patent.

Mounted on the reel panel 202 is a tape read-write head 209. The head may have a single row of flux gaps, as in the preferred embodiment of this invention shown in FIGURES 2 and 3, or it may have a plurality of flux gaps.

In the embodiment shown the guiding surface in which the gaps are formed is substantially cylindrical although it is recognized that other shapes may be used. The head 209 may be mounted by a pair of screws 210 by means of which it may be adjusted with respect to the tape.

Tape 211 from the reel 203 may be trained about a tape guide roller 212 and looped into the left vacuum column 207 and, from the loop in the column passed over a pinch roller 213, under a left tape guide 235, over the read-write head 209, under a right tape guide 236, over a second pinch roller 214 and into the right vacuum column 208. Thence the tape is returned over a tape guide 215 to the reel 204. The rotation of the reels 203 and 204 is automatically controlled to maintain a relatively free hanging loop of tape in each of the columns 207 and 208. Such control is more fully described in said J. A. Weidenhammer et al. patent. Associated with the pinch roller 213 at the left of the reel panel is a reverse tape drive capstan 216, which rotates in a clockwise direction and a nonrotating stop capstan 217. Similarly, associated with the pinch roller 214 at the right of the panel is a forward drive capstan 218, which rotates in a counterclockwise direction and a nonrotating stop capstan 219.

The pinch rollers 213 and 214 are interconnected by a linkage at the back of the reel panel 202 and connected to an energizing means (not shown) which is activated for the concerted rocking movement of the pinch rollers, as shown in the aforementioned Weidenhammer et al. patent. The movement of the pinch rollers is such that, when the left roller 213 is driven against the left drive capstan 216, the right roller 114 is moved to a neutral position midway between the right stop capstan 219 and the right drive capstan 218. The tape is thereby moved in the right to left direction. In order to halt movement of tape, the right pinch roller 214 is driven away from the neutral position and against the right stop capstan 219, while the left pinch roller 213 is driven away from the left drive capstan 216 to a neutral position midway between the left drive capstan 216 and the left stop capstan 217.

By effecting a similar movement of the right pinch roller 214 against the right drive capstan 218, etc., the tape may be driven in the left to right direction.

The vacuum columns 207 and 208 are used as mechanical buffers between the tape reels 203 and 204 and their associated drive capstans 217 and 218. The tape reel movements are coordinated with tape position switches (not shown) located in the vacuum columns, as more fully described in the aforementioned Weidenhammer et al. patent. Suffice it to say that the reel control mechanism is adapted to supply tape from the reels to the vacuum columns 207 and 208 and from the vacuum columns to the drive capstans, with the result that the tape is translated past the head at a constant rate.

The vacuum in columns 207 and 208 is maintained by means of a surge tank 220. This tank evacuates the left vacuum column 207 through opening 221 and evacuates the right vacuum column 208 through the opening 222. The openings 221 and 222 are connected through a manifold 223 via a pipe 224 to the surge tank 220. The level of vacuum in the manifold 223 can be controlled by adjusting a valve 225, and is indicated by a vacuum gauge 226.

In the practice of the present invention, as described more fully subsequently, it is necessary to connect the surge tank 220 to the read-write head 209. Each side of the head is supplied separately via ducts 227, 228. Pressure in each of these ducts is controlled by pressure regulating valves 229 and 230 and is measured by pressure gauges 231 and 232. The ducts are jointed by T connector 233 which is connected to the surge tank 220 via pipe 234.

Referring now to FIGS. 2 and 3, the read-write head assembly 209 consists of a single head portion 11 which in this preferred embodiment is substantially cylindrical in shape. However, it is contemplated that there may be a plurality of head portions, and the surfaces need not be cylindrical. The read-write gap 12 is shown at the uppermost portion of the transducer element 10. As shown in FIG. 3 and in phantom in FIG. 2, longitudinal slots 13 are interleaved between each of six transducer elements. The purpose of these slots is described subsequently. Tape 211 is translated in either direction past and is substantially tangent to the head portion 11, the point of contact being at the read-write gap 12. Tape supporting means, called wiper blocks 14 and 15, which may be cylindrical in shape, are located on either side and may be contiguous with the head portion 11. Tape guides 16 and 17 are provided to channel the tape over the head. Vacuum chambers 18 and 19 (FIG. 2) are formed by the tape covering the top of an enclosure, the sides of which include the head portion 11, the wiper blocks 14 and 15, and the tape guides 16 and 17.

The wiper blocks 14 and 15 may be dynamically air lubricated as taught by the Baumeister et al. application for U.S. Patent, Serial No. 74,150 filed December 6, 1960, a continuation-in-part of application Serial No. 847,762, filed October 21, 1959, now abandoned. In that application it is shown how a thin film of air may be maintained between a cylindrical surface and a magnetic tape passing thereover. This is accomplished by adjusting the following parameters: the velocity of the tape, the tension on the tape, and the angle at which the tape is wrapped about the head.

In the instant application the velocity of the tape is determined by the speed of the capstan motors (not shown) which drive the capstans 216 and 218. The tension on the tape is controlled by varying the pressure in the vacuum columns 207 and 208 by means of valve 225, and the angle at which the tape is wrapped about the head is adjusted by moving the read-write head 209 vertically by means of the pair of screws 210.

The air in the chambers 18 and 19 (FIG. 2) is evacuated by means of ducts 20 and 21 which communicate with the chambers 18 and 19. These ducts are connected to surge tank 220 as previously described. The subatmospheric pressure in chambers 18 and 19 is adjusted so that tape 211 is held in operative contact with the transducer 10 by atmospheric pressure which forces down from above, as illustrated by the arrows in FIG. 2. If it is desired to have the wiper blocks lubricated with an air film, the adjustment of the vacuum source must be reduced or eliminated in at least the downstream chamber in order to avoid collapsing the air film. This reduced vacuum will not lower the holding force against the transducer, because the downward force resulting from tape tension and wrap angle necessary for creating the air film will add to the force holding the tape in position. The transducer is, of course, positioned in direct contact with the tape in this instance. The highest vacuum level is necessary only when no wrap about the head is used, because then the tape will not be positioned accurately between the supporting surfaces and will tend to bounce out of contact with the transducer. The longitudinal slots 13 encourage closer contact between the tape and the head portion 11 by supplying a path for the evacuation of the air which tends to build up directly at the point of tape contact. Since there is a coaction between the vacuum sources on either side of the cylindrical head portion 11 because of the physical connection between them through the slots, the subatmospheric pressure in each of these chambers tends to remain equal at all times. This has the effect of maintaining a more uniform pressure distribution on the tape.

The intimate relationship between the vacuum source and the head portion is highly advantageous for the continuous cleaning of the tape and head surface. This can be illustrated by describing the cleaning process as the tape 211 travels from right to left (FIG. 2). The tape is first cleaned as it passes over the vacuum chamber 19 and before it reaches the head portion 11. Any lose oxide particles are drawn towards the duct 21. As the tape passes over the transducer 10, any oxide which may rub off would not tend to collect or build up on the head portion 12 because it is continuously being cleaned away by both vacuum ducts. In practice, the amount of oxide rubbed off is small because of the very low contact force necessary to keep the tap in operative contact with the transducer.

In summary, the device herein described attains a uniform tape-to-head contact with a minimum normal force by a unique arrangement of transducer surface and tape supporting surfaces. By adjusting the tension on the tape, the tape velocity and the angle of presentation of the tape to a curved surface, the tape may be guided thereover without direct contact with the surface—the tape riding on an air film. The present invention contemplates that two such air lubricated surfaces may be provided (FIG. 1) 14 and 15 for suporting a span of tape 211 therebetween. If a transducer element were located within one or both of these supporting surfaces, the thickness and uniformity of the air film across and along the tape would have to be carefully controlled so as to give a maximum signal intensity and a uniform signal intensity. The difficulty of maintaining this carefully controlled air film is overcome by the instant invention by locating the transducer element 10 at a third surface 11 which is located between the air lubricated supporting surfaces 14 and 15. The third surface 11 is not air lubricated at all but, on the contrary, is in direct contact with the tape. However, the normal force at the third surface is very small because most of the normal force necessary to maintain the tape in position is acting upon the air lubricated surfaces. The normal force caused by tape tension and angle of presentation is high at the air-lubricated tape supporting surfaces 14 and 15, but the friction at these surfaces is reduced to zero because of the lubricating air film. The normal force at the surface 11 is very small because the tape travels in virtually a straight path over that surface. Therefore, the friction, which is proportional to the normal force, is also very small at the transducer surface. In accordance with the invention the tape may be held in contact with the transducer by atmospheric pressure, by evacuating the volume defined by the supporting surfaces, the transducer, and the tape. When this means is employed, the tape may approach the head assembly with little or no wrap angle, thus reducing frictional contact due to large wrap angle.

The invention has been described in connection with magnetic tape feeding devices, but the benefits of the invention can be enjoyed when using other web materials, including but not limited to, paper tape and photographic film.

While the invention has been particularly shown and described with reference to a preferred embodiment thereof, it will be understood by those skilled in the art that various changes in form and detail may be made therein without departing from the spirit and scope of the invention.

I claim:

1. In a device for coaction with a tape being fed in contact therewith, a head comprising:

first and second tape supporting means having arcuate surfaces for supporting said tape across its width so that there is a substantially flat span of tape bridging said supporting means;

means for maintaining an angle of wrap of said tape about said supporting means;

means for feeding said tape over said supporting surfaces at a sufficiently high velocity to draw in enough air to urge said tape from the surfaces of said supporting means;

means for applying a tension to said tape while said tape is being fed, of a value less than that necessary to hold said tape against the surfaces of said supporting means, to thereby create a thin film of air between said tape and said supporting means;

and transducer means disposed between said first and second supporting means on the same side of the tape as said supporting means, said transducer in operative contact with said tape so that said tape is held in contact with said transducer surface by the net downward force resulting from the tension on said tape.

2. Claim 1 above including means for partially evacuating the air between at least one of said supporting means and said transducer.

3. In a device for coaction with tape being fed in contact therewith, a head comprising:

an element adapted to coact in a specific manner with said tape;

structural means for supporting said tape so that there is a span of tape bridging said structural means, said structural means forming, in conjunction with said tape and said element, a pair of substantially enclosed chambers the sides of each chamber being defined by said structural means, said element, and that portion of the tape which spans from the point of contact with said structural means and the point of contact with said element; and aperture means in said head, whereby said chambers can be connected to suction means for reducing the pressure in said chambers, whereby a normal force is exerted on said span of tape by the difference between atmospheric pressure and the reduced pressure in said chambers, to thereby hold the tape in operative contact with said element.

4. In a magnetic recording tape transport of the type in which tape is caused to translate past a tranducer:

transducer means having a surface;

first tape supporting means disposed adjacent one side of said transducer means;

second tape supporting means disposed adjacent the opposite side of said transducer means, said supporting means positioned so as to create a span of tape between them;

evacuating means for creating a subatmospheric pressure in a partially enclosed chamber whose sides are defined by said transducer and one of said supporting means, so that said tape is held in contact with said transducer surface by atmospheric pressure acting on said span of tape.

5. In a magnetic recording tape transport of the type in which tape is caused to translate past a transducer:

a transducer means having a surface;

first tape supporting means disposed adjacent one side of said transducer means;

second tape supporting means disposed adjacent the opposite side of said transducers means, said supporting means positioned so as to support a span of tape between them;

evacuating means for creating a subatmospheric pressure in the space substantially enclosed by said transducer, said first and said second supporting means, and the span of tape so that said tape is held in contact with said transducer surface by atmospheric pressure acting on said span of tape.

6. In a magnetic tape feeding system in which tape is translated over a transducer:

transducer means having a surface adapted to contact said tape across its width;

first and second supporting means adjacent and on opsite sides of said transducer in the direction of tape feed for supporting said tape as it translates past said transducer to thereby create a span of tape between said supporting means;

tape guiding means for maintaining said tape in a rectilinear path as it translates over said transducer and said first and second supporting means;

means for creating a subatmospheric pressure in the volume defined by said tape, said transducer, said guiding means, and said first supporting means;

means for creating a subatmospheric pressure in the volume defined by said tape, said transducer, said guiding means, and said second supporting means; whereby said tape is held in contact with said transducer by atmospheric pressure acting on said span of tape.

7. In a web feeding device in which said web is caused to translate past a tranducer:

transducer means;

first suporting means for supporting said web as it approaches said transducer;

second supporting means for supporting said web as it leaves said transducer, said supporting means positioned so as to create a span of web between them;

guide means for maintaining said web in a rectilinear path as it translates past said transducer;

a first vacuum chamber defined by the volume enclosed by said web, said transducer means, said first supporting means and said guide means;

a second vacuum chamber defined by the volume enclosed by said web, said transducer means, said second supporting means and said guide means; and means for maintaining a subatmopsheric pressure in said first and second vacuum chambers so that said web is held in contact with said transducer means by atmospheric pressure acting on said span of web.

8. In a web feeding device in which a web is translated past a transducer:

first and second supporting means for supporting said web to thereby create a span of web between said supporting means;

a transducer having a curved surface, said transducer located between said supporting means;

guide means for rectilinear guiding of said web over said supporting means and said transducer means; and evacuating means for creating a subatmospheric pressure in at least one of the partially enclosed chambers whose sides are defined by said web, at least one of said supporting means and said transducer means, so that the web is held in contact with said transducer means by atmospheric pressure acting on said span of web.

9. In a web feeding device in which said web is caused to translate past a transducer;

transducer means substantially arcuate in shape with longitudnial slots cut therein;

first supporting means for supporting said web as it approaches said transducer;

second supporting means for supporting said web as it leaves said transducer, said supporting means positioned so as to create a span of web between them;

guide means for maintaining said web in a rectilinear path as it translates past said transducer;

a first vacuum chamber defined by the volume enclosed by said web, said transducer means, said first supporting means and said guide means;

a second vacuum chamber defined by the volume enclosed by said web, said transducer means, said second supporting means and said guide means; and means for maintaining a subatmospheric pressure in said first and second vacuum chambers, said slots causing said subatmospheric pressure in said chambers to remain substantially equal, so that said web is held in tangential contact with said transducer by atmospheric pressure acting on said span of web.

10. In a magnetic tape processing apparatus the combination comprising:

an element adapted to coact in a specific manner with the tape;

transport means for feeding the tape past said element;

structural means for supporting the tape as it is fed past said element so that there is a span of tape bridging said structural means, said structural means forming, in conjunction with the tape and said element, a pair of substantially enclosed chambers the sides of which are defined by said structural means, said element, and the tape; and suction means communicating with said chambers for reducing the pressure in at least one of said chambers, whereby a normal force is exerted on said span of tape by the difference between atmospheric pressure and the reduced pressure in at least one of said chambers, to thereby hold the tape in operative contact with said element concurrently with the feeding of the tape past said element.

References Cited in the file of this patent

UNITED STATES PATENTS

| | | |
|---|---|---|
| 2,912,518 | Maxey | Nov. 10, 1959 |
| 2,984,398 | Chalmers | May 16, 1961 |
| 2,994,489 | Hare | Aug. 1, 1961 |
| 3,075,051 | Pankratz et al. | Jan. 22, 1963 |

FOREIGN PATENTS

| | | |
|---|---|---|
| 811,609 | Great Britain | Apr. 8, 1959 |
| 814,680 | Great Britain | June 10, 1959 |